UNITED STATES PATENT OFFICE.

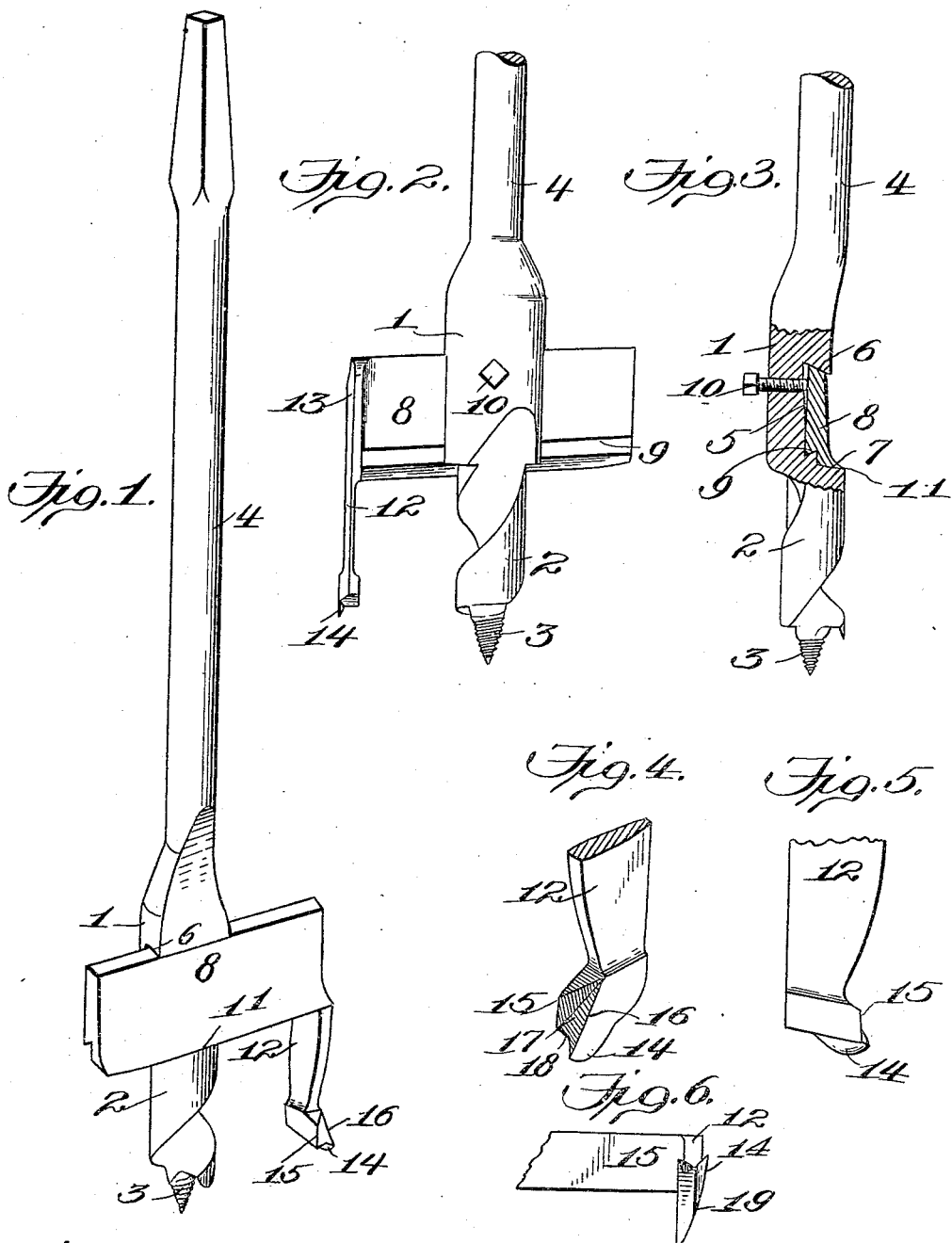

LELON WITT GARNER, OF EXPO, VIRGINIA.

EXPANSIBLE BORING-BIT.

No. 931,593.      Specification of Letters Patent.      Patented Aug. 17, 1909.

Application filed October 30, 1908. Serial No. 460,307.

*To all whom it may concern:*

Be it known that I, LELON W. GARNER, a citizen of the United States, residing at Expo P. O., in the county of Norfolk and State of Virginia, have invented new and useful Improvements in Expansible Boring-Bits, of which the following is a specification.

My present invention relates to improvements in boring bits and more especially to the adjustable or expansible type whereby holes of different sizes may be made with the same tool, and it has for its object primarily to provide an improved bit of this character which embodies a cutter which depends at a side of the auger point and serves to cut away the material to form the wall of the opening, the cutter being of an improved form whereby it may easily cut through the material so as to form a relatively smooth wall for the hole, and it will possess sufficient clearance as to require comparatively little power to operate it.

Another object of the invention is to provide an improved bit of this character wherein a blade is mounted transversely of the auger at a sufficient distance above the auger point as will enable holes of ordinary depth to be formed without bringing the transverse blade into action, although such blade will operate to remove the material from the hole after the same has reached a given depth, a cutter extending downwardly from the blade a sufficient distance to enable it to cut away the material surrounding the hole before the transverse blade is brought into action.

A further object of the invention is to provide improved means for mounting the transverse blade and cutter upon the bit whereby the blade may be securely locked thereto, although it may be quickly unlocked when desired in order that it may be adjusted for holes of different diameters, or it may be removed.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 is a perspective view of an expansible boring bit constructed in accordance with my present invention. Fig. 2 is a rear elevation of the lower portion of the bit. Fig. 3 represents a side elevation of the bit, a portion thereof being shown in section to illustrate the means for locking the transverse blade in different adjusted positions upon the bit; and Figs. 4, 5 and 6 are detail views of the cutter.

Similar parts are designated by the same reference characters in the several views.

In the accompanying drawing, I have shown one specific embodiment of the invention wherein the bit comprises a head 1 provided at its lower end with an auger 2 and a screw point 3, the latter serving to center the bit and feed the same to the material to be bored. The shank 4 of the bit may be square or otherwise formed appropriately for the reception of a bit stock or other operating tool. The auger portion of the bit is preferably formed comparatively long, that is to say, it is of a depth equal to the thickness of ordinary boards, and the head of the bit is provided at a point adjacent to the upper end of the auger with a transverse slot or recess 5, the lower portion of the rear wall of this recess being preferably perpendicular and the remaining portion inclined inwardly toward its top. This recess is provided with upper and lower walls 6 and 7, these walls being undercut or inclined in reverse directions after the manner of a dove-tail. The incline of the upper wall is preferably greater than that of the lower wall. The upper wall 6 is preferably of greater depth than the lower wall 7, and into the recess is fitted a blade 8 which has correspondingly beveled upper and lower edges to fit the inclined walls of the recess. The blade is provided on its lower rear edge with a channel 9 which forms a vertical wall which seats against the forward face of the bit-head whereby the rearward thrust of the blade will be sustained. The blade which fits into the recess is preferably of such a size as to permit its upper edge to tilt slightly, and a locking screw 10 is tapped through the head of the bit from the rear side and its forward end is arranged to enter the recess and bear against the rear side of the blade. When this screw is loosened, the blade may be freely shifted in a direction transversely of the bit and it is then possible to adjust the blade according to the different diameters of the holes to be bored, or the blade may be removed for sharpening or other purposes. When the locking screw is tightened, it bears against the rear side of the blade at a point adjacent to its upper edge, the blade being thereby tilted outwardly at its upper edge which tilting movement will cause its upper edge to firmly bind against the upper wall 6 of the recess, and by reason of the inclination of the said wall, the bit will be firmly locked within the recess. The lower edge of the blade is extended forwardly and sharpened to form a cutting edge 11, and this edge is adapted to enter the material and remove the same during the boring of the hole. The blade, however, is spaced a sufficient distance above the point of the auger to enable the bit to bore holes of ordinary depth without bringing the cutting edge of the blade into action. The lower edge of the blade is inclined upwardly so as to provide sufficient clearance for its cutting edge.

A cutter 12 is formed at one end of the transverse blade and it extends downwardly from the lower edge of the blade in a direction parallel to the axis of the bit and to a point at the same level with the lower end of the auger 2.

A flange 13 extends rearwardly from the blade in order to provide a reinforcement for the cutter, and the blade 8 is preferably tilted downwardly toward the end on which the cutter is mounted whereby dragging of the opposite end of the blade is prevented. This cutter serves to cut away the material so as to define the wall of the hole, and it is provided at its under side with a scoring edge 14, and an inner cutting edge 15, the latter being produced by forming an inclined channel 17 in the forward side of the cutter which forms an incline 16 to remove material from the path of the cutter. The scoring edge 14 acts preliminarily upon the material to define the size of the hole to be bored, and as the cutter enters the material, the cutting edge 15 will cut the material to define the inner wall of the annular channel which is produced by the cutter. A horizontal cutting edge 18 is also formed at the lower portion of the cutter below the cutting edge 15 whereby the material may be lifted or removed during the entrance of the cutter. The outer side of the cutter is also curved toward its rear as shown at 19, thus providing sufficient clearance to prevent dragging or binding of the cutter during the boring operation. The under side of the cutter in rear of the horizontal cutting edge 18 is preferably inclined upwardly at a suitable angle to form the necessary clearance, this heel serving to sustain the bit should the same be tilted abruptly, and it also prevents the cutters 14, 15 and 18 from entering too deeply into the material while in such position.

In operating a boring bit constructed in accordance with the present embodiment of my invention, the transversely extending blade is set according to the diameter of the hole to be bored. By turning the bit, the screw point first enters the wood or other material and when the auger reaches the surface of the material to be bored, the cutter which is arranged at substantially the same level as the lower end of the auger will also operate upon the material, the scoring edge 14 defining the diameter of the hole and the cutting edges 15, 16 and 18 removing the material as the cutter passes around the hole, and holes of ordinary depth may be bored before the cutting edge of the transverse blade engages the surface of the material, the material being removed in the form of a disk. Thus, in boring holes of ordinary depth, the cutter may be arranged comparatively close to the auger and, in such cases, the opposite end of the transverse blade will not interfere with the boring of the hole even though this blade be of a length considerably greater than the diameter of the hole. In boring holes of greater depth, however, the continued operation of the bit will bring the cutting edge of the transverse blade into action, and this cutting edge will remove the material surrounding the auger as the bit enters.

I claim as my invention:—

1. A boring bit of the class described comprising an auger portion, a part extending transversely of the bit at a distance above the auger portion, and a chip defining and lifting cutter depending from one end of the said transverse part and arranged in the transverse plane of the lower end of said auger portion.

2. A boring bit of the class described comprising an auger portion, a part extending transversely of the bit at a point above the auger portion, and a chip defining and lifting cutter depending from one end of said transverse part and arranged substantially in the transverse plane of the lower end of the auger portion.

3. A boring bit of the class described comprising an auger portion, a blade extending transversely of the bit at a distance above the auger portion, and a depending cutter on one end of said blade having chip defining and lifting edges and of a length substantially equal to the length of the auger portion.

4. A boring bit of the class described comprising an auger portion, a transverse blade having a cutting edge spaced above the lower end of the auger portion, and a chip defining and lifting cutter attached to said blade and having a cutting portion disposed in the transverse plane of the lower end of the auger portion.

5. A boring bit of the class described comprising an auger portion, a transverse part carried thereby, and a depending arm carried by said part and having a cutting edge arranged transversely of the axis of the bit, an inner chip defining edge above said cutting edges and a scoring edge depending from the said cutting edge.

6. A boring bit of the class described comprising an auger portion, a transverse part attached thereto, and an arm depending from said transverse part and having inner and outer cutting edges and also a chip lifting edge.

7. A boring bit of the class described comprising an auger portion, a transverse blade attached thereto, and an arm depending from one end of said blade and having an inclined channel formed on its forward face providing an inner cutting edge an outer scoring edge and a surface for removing material from the path of the cutter.

8. A boring bit of the class described comprising an auger portion, a transverse blade attached thereto, and a depending arm carried by said blade, the arm having a depending scoring edge, a cutting edge arranged transversely of the axis of the bit, and also an inner cutting edge and an outer scoring edge both arranged substantially parallel to the axis of the bit.

9. A boring bit of the class described comprising a head, a blade extending transversely thereof, and an arm depending from the blade, and provided at its lower end with a chip defining and lifting cutter, said arm having a reinforcing flange arranged in alinement therewith and formed at the rear side of the blade, and the outer side of the arm being curved inwardly toward its rear edge.

10. An expansible boring bit comprising a head having a transverse recess having an overhanging upper wall, a blade to fit into said recess, the upper edge of the blade being beveled and tiltable outwardly, and a locking device arranged to engage the rear side of the blade to tilt its upper beveled edge outwardly and thereby lock it with the overhanging wall of said recess.

11. An expansible boring bit having a head provided with a recess the upper and lower walls of which are reversely inclined, said upper wall overhanging the recess, a transverse blade fitted in said recess and having beveled upper and lower edges to coöperate with the corresponding walls of the recess, and a locking device mounted to engage the rear side of the blade and operable to tilt the upper portion of the blade outwardly to lock it with the overhanging wall of the recess.

12. An expansible boring bit comprising a head having an auger portion, the head being formed with a recess having undercut upper and lower walls, a transverse blade adapted to fit into said recess and having a beveled upper edge, a cutter depending from the outer end of the blade, and a locking screw entering said head from the rear side and coöperating with the rear side of the blade for tilting the upper portion thereof outwardly to lock it in said recess.

In testimony whereof I have hereunto set my hand in presence of two subscribing witnesses.

LELON WITT GARNER.

Witnesses:
ROSE M. SEFTON,
JAMES L. NORRIS, Jr.